United States Patent Office 3,794,704
Patented Feb. 26, 1974

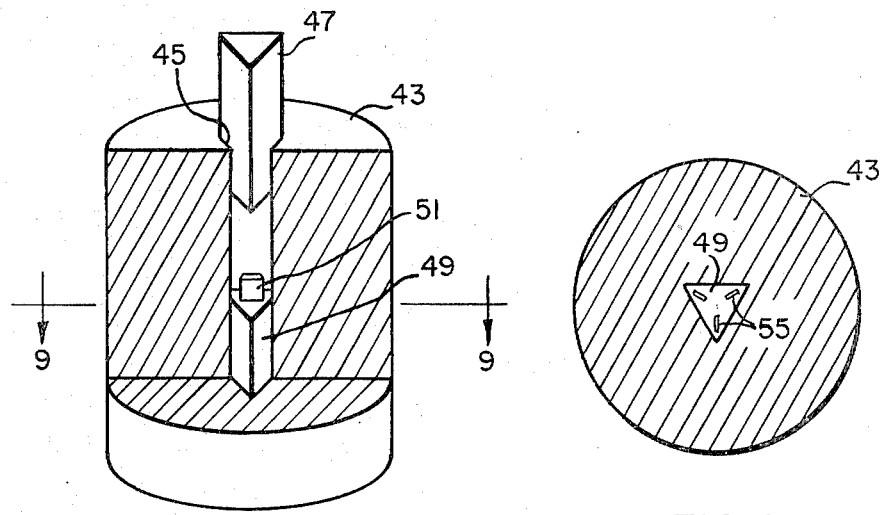
FIG. 8
FIG. 9
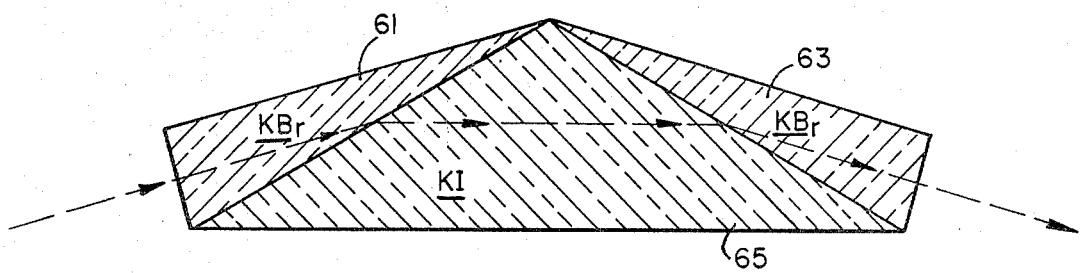
FIG. 10
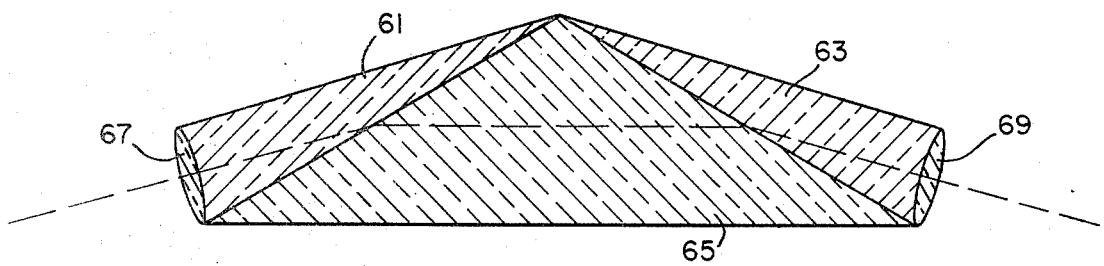
FIG. 11

3,794,704
METHOD OF FORMING REFRACTIVE OPTICAL ELEMENTS FOR INFRARED RADIATION
John D. Strong, 136 Gray St., Amherst, Mass. 01002
Filed Nov. 17, 1971, Ser. No. 199,510
Int. Cl. B29d 11/00
U.S. Cl. 264—1                8 Claims

ABSTRACT OF THE DISCLOSURE

In the method disclosed herein, infrared optical elements are formed by hot forging a boule grown from a molten alkali halide. The boule is heated to a temperature at which naturally occurring surface fissures in the particular alkali halide will not propagate and is then worked between a pair of die components to conform the boule to the desired shape.

BACKGROUND OF THE INVENTION

This invention relates to a method of forming refractive optical elements for infrared radiation and more particularly to a method of forming infrared lenses and lens elements of the type disclosed in my copending application Ser. No. 108,937, filed Jan. 22, 1971, for Achromatic Doublet Lens For Infrared Radiation, now U.S. Patent No. 3,674,330.

Heretofore, infrared lenses, typically singlet lenses, have been fabricated from alkali halides only by essentially conventional methods, e.g. wet-string sawing, grinding, polishing and figuring as described in John D. Strong Procedures in Experimental Physics, Prentice-Hall 1958, pp. 86 and 87. Typically, much material is lost in the material cut away from the original boule and the boule must always be larger in any given dimension than the optical element which is to be formed therefrom. Further, such procedures are time consuming and expensive.

Among the several objects of the present invention may be noted the provision of a novel method of forming refractive optical elements for infrared radiation; the provision of such a method in which the elements formed are of relatively precise configuration or shape; the provision of such optical elements which are constructed of alkali halides; the provision of such elements which have optically smooth surfaces; the provision of such a method which is relatively simple and inexpensive in practice and which is reliable. Other objects and features will be in part apparent and in part pointed out hereinafter.

SUMMARY OF THE INVENTION

In accordance with one aspect of the invention, it has been found that large alkali halide single crystals, which have been grown from a molten bath, are ductile and therefore can be forged or shaped if surface cracks which normally make it brittle are prevented from propagating. Such a crystal is referred to herein as a boule or starting piece for fabrication. As used herein, the term boule should be understood to include chunks of crystal which have been cleaved from a larger crystal mass which was grown as described.

While such surface cracks can be dissolved by a stream of water so that a long, thin, parallelepiped of such synthetic crystal can be bent while being held under such a water stream, this characteristic is not particularly useful in the forming of infrared optical elements. It has also been found that the propagation of surface cracks of the respective alkali halide can be eliminated if the crystal is heated to an elevated temperature. Thus, if a boule of a fused-salt-grown alkali halide crystal is heated to or above a predetermined temperature, i.e. the temperature at which surface fissures fail to propagate, it may be forged or caused to conform, under pressure, to the shape of a die applied thereto.

It may be noted that the hot forging properties of the synthetic crystals grown from fused salt do not inhere in the natural crystals nor in synthetic crystals grown from aqueous solutions. These latter forms of such crystals contains water and therefore decrepitate upon heating. The method of growing alkali halide crystals from a molten salt is described in Physical Review 36, No. 11, (1930).

Briefly, the method of the present invention involves the forming of infrared optical elements by providing at least two die components having surfaces defining a cavity corresponding to the desired configuration of the optical element to be formed. A boule grown from a molten mass of the selected alkali halide is placed between the die surfaces and the boule and the die components are then heated to a temperature at which surface fissures in the boule will not propagate. By applying a substantial pressure between the die components, the boule is caused to conform to the shape of the cavity. Upon subsequent relatively slow cooling, the boule may be removed from the die components.

BRIEF DESCRIPTION OF THE DRAWINGS

FIG. 8 illustrates a die system useful in forming a prism by the present method;

FIG. 9 is a section taken on the line 9—9 of FIG. 8;

FIG. 10 illustrates a composite prism system which may be constructed by the method of the present invention; and FIG. 11 shows the prism system of FIG. 10 with the addition of collimating and focusing lenses.

Corresponding reference characters indicate corresponding parts throughout the several views of the drawings.

DESCRIPTION OF THE PREFERRED METHODS AND EMBODIMENTS

Figure 2:
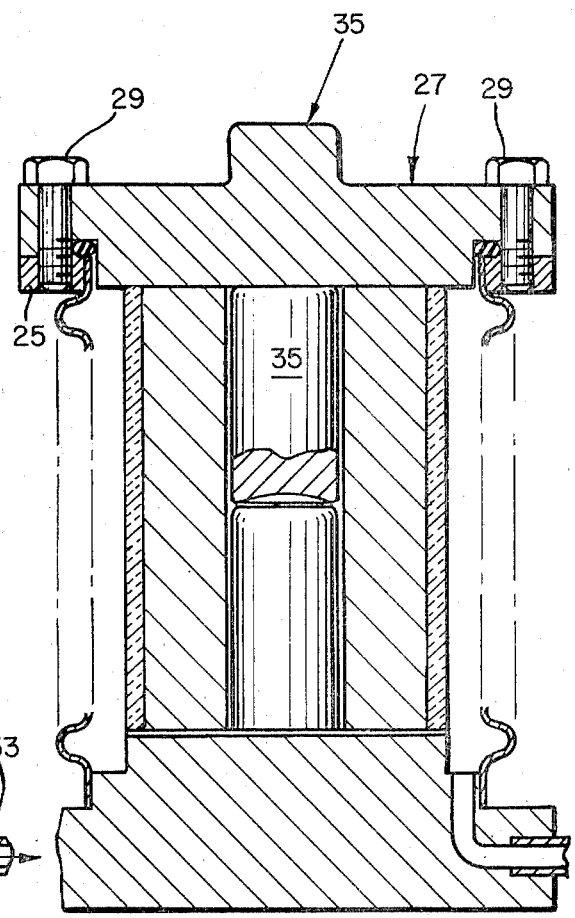
FIG. 2 shows the die system of FIG. 1 in a closed position.
Figure 3:
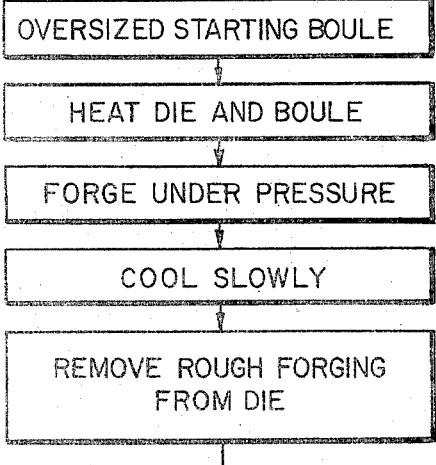
FIG. 3 is a chart illustrating successive steps in the practice of one embodiment of the method.
Figure 3:
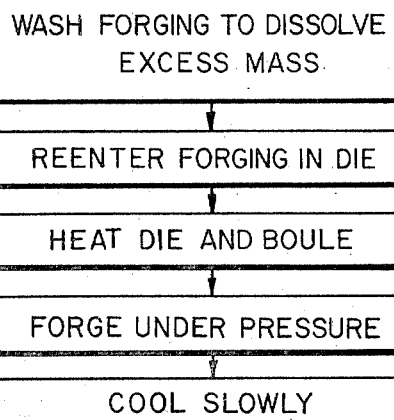

A preferred method of forming optical elements according to the present invention is to employ a two-step hot forging. Apparatus for performing such a forging is illustrated in FIGS. 1 and 2, in different phases of the operation, and the sequence of steps performed in this preferred practice of the invention is illustrated in the diagram of FIG. 3.

Figure 1:
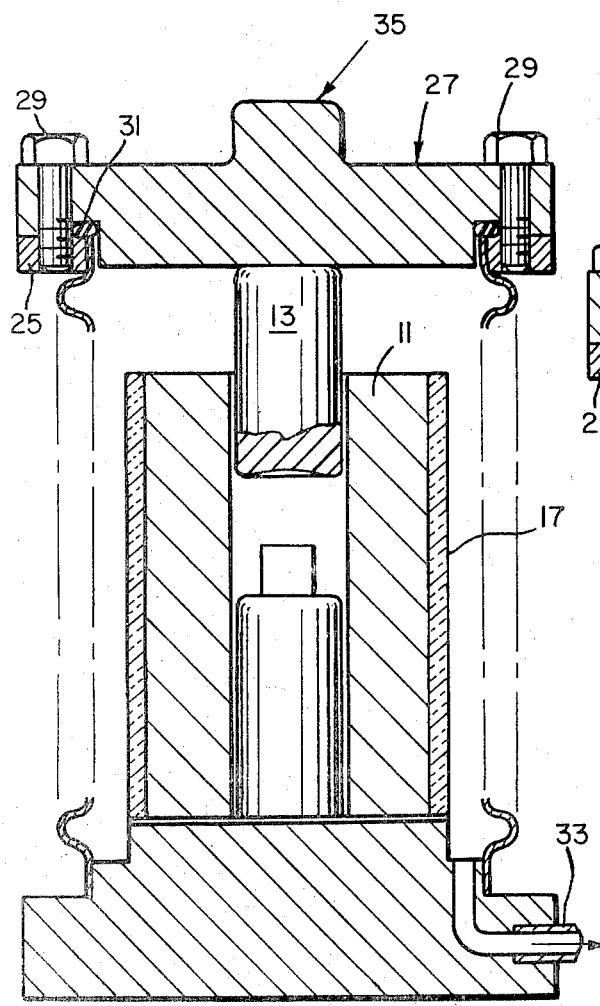
FIG. 1 is a plan view of a die system useful in the practice of the hot lens forging method of the present invention.

Referring now to FIG. 1, the die system employed there utilizes three die components, a thick-walled tubular element 11 and a pair of plungers 13 and 15 which fit closely within the bore of element 11. The tubular die member 11 may include a surrounding heater, as indicated at 17, for heating the die and the optical material held therein. The tubular die 11 may also, if desired, be assembled from two parts which separate along a vertical part line to facilitate removal of a formed lens component as described hereinafter, the two parts being securely bolted together during forming.

Preferably, the die system is held within an evacuable chamber which permits force to be applied between the die members 13 and 15 while the die system is heated and under vacuum. In FIG. 1, such a chamber is illustrated as being constituted by a base 21 to which is attached an extensible metal bellows 23. The upper end of bellows 23 is provided with a relatively heavy, annular rim 25 to which a cover 27 may be secured by bolts 29. A suitable high temperature vacuum seal, e.g. a copper gasket, is employed as indicated at 31. An outlet 33 is provided on the base 21 through which the chamber containing the die system may be evacuated during use. The chamber, with the enclosed die system, is adapted to be placed in a press so that, by pressing down on the cover 27 with respect to the base 21 the plungers 13 and 15 can be driven towards each other. Preferably, the cover 27 includes a central boss 35 which allows the force to be concentrated on the plunger 13 when it is driven essentially flush with the upper surface of the tubular die member 11. The vacuum chamber is particularly useful in preventing the formation of inclusions during welding but in forging alone is not always necessary.

The facing ends of the plungers 13 and 15 are contoured so as to provide therebetween a cavity having a shape corresponding to the desired configuration of the optical element to be formed. The dies 13 and 15 illustrated in FIGS. 1 and 2 are adapted for the shaping of a plano-convex lens element and thus the upper surface of the plunger 15 is flat while the lower face of the plunger 13 is concave. Preferably, the die elements 11, 13 and 15 are constructed of stainless steel which is then chrome plated over at least the working surfaces so as to provide a surface which is optically smooth, having regard to the wavelength range of the radiation with which the finished optical element is to work.

As indicated previously, the forging is preferably accomplished in two stages. Initially, a right parallelepiped crystal or boule 16, cleaved from a single alkali halide mass grown from fused salt, is placed between the plungers 13 and the vacuum chamber is assembled as illustrated in FIG. 1. The chamber is then evacuated and the dies are heated to the forging temperature where naturally occurring surface fissures do not propagate. In the case of potassium bromide, a temperature of about 300° C. is appropriate. Corresponding temperatures for the various alkali halide crystals useful in the practice of the present invention are indicated in Table I below.

TABLE I

| Alkali halide: | Temperature, °C. |
|---|---|
| KCl | 300 |
| NaCl | 300 |
| KBr | 300 |
| CsBr | 225 |
| KI | 225 |
| CsI | 225 |

While the dies and the boule are at the elevated temperature, sufficient force is applied against the opposite ends of the plungers 13 and 15, i.e. through the cover 27 and the base 21, to cause the boule to conform to the shape of the cavity defined by the inner ends of the plungers. A hydraulic press is suitable for this purpose. The force applied is not highly critical in that the movement of the plungers can be perceived when the crystalline material begins to flow. For a lens of 1 inch diameter, a force of 2400 lbs. is appropriate. This flow or slippage occurs along the natural crystalline axes of the starting boule and that the resultant lens is therefore likewise a single crystal.

After the forming itself, the die system with the formed boule is allowed to cool relatively slowly. This is readily accomplished by burying the die in an insulating material such as diatomaceous earth. The latter stages of cooling are the more critical, i.e. when the work is nearly at room temperature and is relatively brittle. Since the thermal coefficients of expansion for the alkali halides are greater than those of the materials used for the die parts, e.g. stainless steel, the workpiece will tend to release from the die surfaces. If a tendency to stick to certain die surfaces is encountered, this can typically be overcome by providing a light coating of a high temperature silicone grease on the working surfaces of the dies before forging. The grease is applied and the die surface is then rubbed with a clean cloth to remove all excess leaving a surface layer of the silicone on the die.

Because the temperature coefficient of the steel die, typically $90 \times 10^{-7}$ per °C., is not equal to that of the alkali halide workpiece, it is necessary to allow for the contraction of the radius of curvature of the formed surfaces on the work as the crystal lens cools from the forming temperature, e.g. from 300° C. to room temperature, about 25° C.

This contraction for a KI component on cooling will be $$\frac{\Delta R}{R} = 426 \times 10^{-7}(300-25) = 0.0117,$$

where R is the radius of curvature.

It is necessary to consider also that the radius of curvature on the steel plunger will have expanded, at the forming temperature, from its room temperature curvature by the amount $$\frac{\Delta R}{R} = 90 \times 10^{-7}(300-25) = 0.0025.$$

If, for example, one desired to achieve a radius of curvature that would become R=10 cm., on a finished KI lens component after it had cooled to room temperature, one would need to use a steel plunger, taking account of both expansion and contraction, with a radius of curvature of R'=10(1+0.0117) (1−.0025)=10.092 cm.

Allowance for the expansion of the curvature of liners and for the expansion coefficients of other alkali halides may be similarly calculated.

While it is possible to generate optical surfaces in an initial forging, double forging is sometimes preferred. The first forging merely obtains a rough blank which conforms generally to the desired lens element shape. After the initial forging, the resultant lens-shaped blank is removed from the dies and is washed to remove any surface scars or fold marks which may have been left in the surface by the initial forging process. Preferably, the size of the initial boule is selected so that its mass is somewhat greater than that of the finished lens, given the desired parameters of surface shape and lens thickness. Accordingly, the washing is carried on until the measured mass of the intermediate blank is reduced to that corresponding or calculated for the finished lens.

After washing, the lens elements is returned to the die cavity, the die elements having preferably been cleaned and polished between the successive forging operations. The forming dies may be provided with azimuth marks and the replication of the marks in the formed boule will facilitate the repositioning of the boule with respect to the dies. If the two piece tubular die component described previously is used, the vertical part line of the die component will provide a suitable mark on the forging. The chamber is again evacuated and the die elements heated to the forging temperature. A second application of a force sufficient to produce flowing of the crystalline material is then performed. During this second forging, the surface of the crystalline material is caused to conform very exactly to the surfaces of the plunger elements, i.e. so that an optical finish is imparted to the crystalline material. After the forging step, the die elements and the formed lens are again allowed to cool relatively slowly in the manner described previously.

If it is desired to obtain a better finish than that which can readily be obtained with metal surfaces on the working ends of the plungers 13 and 15, e.g. for use at the shorter infrared wavelengths where a better optical finish is needed, the working surfaces of these die elements may be provided with a lining of glass which is suitably polished. In the case of the flat faced plunger 15, a mica lining may be used as an alternative. However, if linings of such materials are to be used to obtain a better finish, it will typically be necessary to provide two sets of die plungers since the lined plungers which are employed to obtain the improved optical surface will typically not be able to withstand the localized forces generated during the forging of the irregularly shaped initial boule. As is understood, the quality of finish which is necessary varies as a function of wavelength since scattering from a surface varies inversely as the square of wavelength. For example, scattering from a given surface at 3 micron wavelength (infrared) is one thirty-sixth (1/36) of that at 0.5 micron wavelength (visible).

Figure 4:
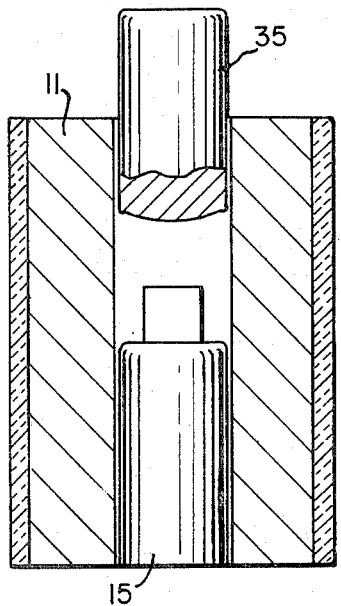
FIGS. 4 and 5 illustrate dies useful in the forming of a negative lens element.
Figure 5:
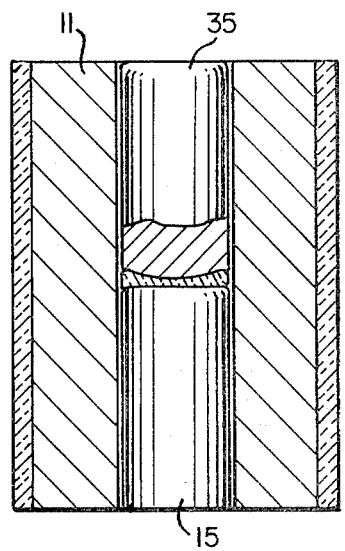

As will be understood, negative lens elements may be made in essentially the same manner as the positive element resulting from the method described with reference to FIGS. 1 and 2. FIGS. 4 and 5 illustrate the corresponding steps in making such a negative element, the vacuum chamber portion of the apparatus being omitted to simplify the drawings. In the making of the negative element, the same tubular die component 11 and flat ended plunger 15 may be used as in the example of FIGS. 1 and 2. The upper plunger element, designated 35, now however is provided with a convex lower surface so that the resultant alkali halide forging has a corresponding concave surface. In other words, the resultant lens element will be a plano-concave lens element. Again, it is desirable to utilize the two step forging process described with reference to FIG. 3.

In accordance with another aspect of the invention, it has been found that separate pieces of the same alkali halide or even pieces of different alkali halides may be welded together by the hot forging method of the present invention, it being understood that the alkali halide crystals used are of the type which are grown from fused-salts, as in the previous description. Accordingly, it is possible to weld together the two components of an achromatic doublet of the type described in my copending application Ser. No. 108,937, thereby to obtain a unitary lens assembly which may be relatively easily handled.

Figure 6:
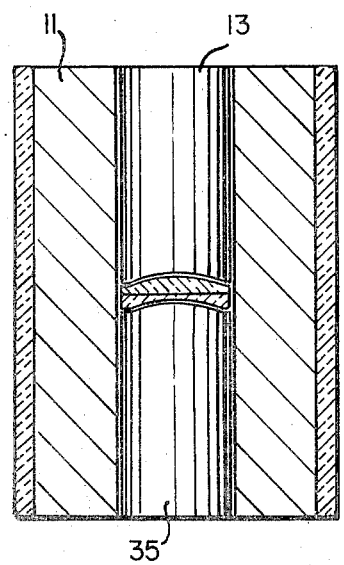
FIG. 6 illustrates an arrangement of dies useful in welding positive and negative lens elements.

While matching curved surfaces can be welded in accordance with the practice of the present invention, the welding procedure is simplified if the weld is to occur between matching planar faces. For example, such a doublet may be obtained by combining a positive element generated by the method discussed with reference to FIGS. 1 and 2 with a negative element generated by the method described with reference to FIGS. 4 and 5, these two elements being welded together with their plane faces in optical contact. If the length of the flat ended plunger 15 is selected to be essentially equal to one-half the length of the tubular die member 11, the welding can be accomplished using the only die components which were employed in the initial shaping of the elements of the composite lens. Such an arrangement is illustrated in FIG. 6 in which the appropriate die components and previously shaped lens elements are assembled in appropriate relationship. In this figure, the vacuum chamber surrounding the die components has again been omitted but it should be understood that the use of the vacuum during welding is even more desirable than during shaping in order to avoid inclusions along the weld interface. Assuming that the length of the plane faced die 15 utilized in forming both elements is equal to one-half the length of the tubular element 11, it can be seen that the interface between the two optical components will occupy essentially the same position, with respect to the tubular die 11, as did the flat die face in the shaping operations which formed the two optical components. Thus, essentially the same portion of the tubular die bore will be utilized and errors due to residual taper in the bore will be avoided. Since the pressure needed to accomplish welding is applied to each lens element by means of the same die which formed the respective surface to which the pressure is applied, it can be seen that localized forces which might introduce distortion are avoided. To obtain welding under pressure, the die system and the lens elements are preferably heated to a temperature somewhat above the higher of the forging temperatures of the two materials being welded. Appropriate pairs of materials for achromatic doublets are given in Table II below, together with the wavelength range over which each pair is particularly useful. Further useful characteristics of these particular pairs are described in my previously mentioned copending application Ser. No. 108,937. While the thermal coefficients of expansion of the various pairs do not match exactly, they are sufficiently balanced to allow welding in accordance with the practice of the present invention.

TABLE II

| Alkali halide pair: | Wavelength range |
| --- | --- |
| KCl-NaCl | 1.5–14 |
| NaCl-KBr | 3–14 |
| KBr-KI | 6–24 |
| CsBr-CsI | 10–38 |

Figure 7:
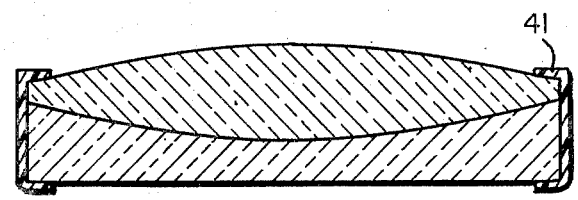
FIG. 7 illustrates an alternative construction of assembling a doublet lens.

While welding yields a relatively easily handled composite lens, the longer wavelengths of infrared radiation permit optical contact to be established without welding or cementing. So-called optical contact is achieved when no air space greater than $$\frac{\lambda}{12}$$

remains. With air spacing below this level there is substantially no intersurface reflection. At a wavelength of six microns the mechanical tolerance is thus one-half micron which is achievable with hot forged components according to the present invention. In such a case, the lens components may be held in optical contact by an annular rim as illustrated at 41 in FIG. 7. As should also be understood, components constructed according to the present method may also be assembled in air spaced systems. Designs for various doublets employing such air spacing are disclosed in my copending application Ser. No. 108,937.

In addition to lens components, prisms can also be constructed by the method of the present invention, as illustrated in FIGS. 8 and 9. In the die set illustrated in these figures, an outer die 43 having a longitudinal bore 45 of triangular cross-section is provided with a pair of closely fitting plungers 47 and 49. To form the prism, a starting crystal or boule 51 is placed between the plungers, i.e. a parallelepiped cleaved from an alkali halide mass grown as a single crystal from fused-salt. After the die parts and the boule have been heated to the temperature appropriate for the particular halide, pressure is applied causing the boule to be formed or forged to the shape of the cavity. Since the material which is being hot forged will weld, it is also possible to use several chunks of fused-salt grown crystal, whose cumulative mass is equal to the desired mass. Preferably, one of the plungers includes three radially disposed, V-shaped ridges projecting into the cavity, as indicated at 55. The grooves thereby replicated in the bottom surface of the resultant prism are then useful in precisely mounting and locating the prism in an optical instrument. In view of the typically larger size and somewhat more irregular shape typical of prisms, a very gradual cooling is desirable after forging. Since the alkali halide of the forged prism has a higher thermal coefficient of expansion than the steel of which the die components are typically constructed, the prism will release from the cavity. Again, the forging is preferably done in two steps with the washing of the optical element between the intial shaping and the final finishing and with the addition of a highly polished liner to the die cavity to obtain the desired final finish. The liner may be a thin lamella of mica. It may be noted that such liners need be added only to those faces which will constitute the optical faces of the finished prism.

Composite prisms can also be constructed according to the present invention, each of the elements of the prism being forged as described with reference to FIGS. 8 and 9. In FIG. 10, such a prism is illustrated in which KBr wedges 61 and 63 are in optical contact with a KI main prism 65. The advantage of this prism is that a much larger dispersion $$\frac{d\theta}{d\lambda}$$

is attainable with an equal or lower loss of transmission from reflections at prism interfaces. In appearance, this is a KI prism of angle 2A and index N immersed in BBr of index n, the angle between the entrance and exit faces and the KBr KI interface being 90°–A. In function, however, this composite prism acts as a KBr prism of angle 180°–A but with much suppressed reflection losses. Thus, if A equals 60 degrees, the composite acts as a prism of index n and angle 120 degrees. The prism of FIG. 10, called a Wernike prism, requires optical contact at the N–n interface and this is optimally achieved with pressure welding in accordance with the present invention. As a mechanical application of pressure to produce welding of such components is not conveniently arranged, such welding may be accomplished by hydrostatic pressure developed by immersing the assemblage in molten tin to which the necessary pressure is applied, the surface tension of the tin preventing its entrance along the interfaces between the prismatic elements.

FIG. 11 illustrates a similar prism construction in which KI lenses 67 and 69 have been applied to the entrance and exit faces of the composite prism of FIG. 10. The faces of the KBr prism wedges are in this case shaped to optically mate with the curved surfaces of the KI lens elements so that a so-called "half immersed" color-corrected doublet lens is, in effect, provided at each end of the prism. Such immersed lenses are also described in my previously identified copending application. This latter ensemble, provided with appropriate entrance and exit slits, constitutes an essentially complete infrared spectrometer.

While the method of the present invention is suitable for the production of finished optical elements as described above, it should be understood that this method is also suitable for the production of blanks which are of generally the desired configuration but which are to be finished by more conventional methods. Likewise, optical elements in addition to those specifically disclosed herein, e.g. Fresnel lenses, can also be constructed by means of the present hot forging method.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:
1. The method of forming an infrared lens of predetermined characteristics, said method comprising:
   providing a generally tubular, first die member;
   providing first and second die plungers slidable within said first die member, the facing ends of said plungers having surfaces defining therebetween a cavity of a first preselected shape, at least one of said surfaces being curved; the depth of said cavity being predetermined in correspondence with the predetermined desired characteristics of the lens;
   placing in said first die member a boule grown from a molten mass of an alkali halide material selected from the group consisting of KCl, NaCl, KBr, CsBr, KI and CsI, the weight of said boule corresponding to the volume of said cavity;
   heating said die member and plungers and said boule to a temperature at which surface fissures in said boule do not propagate;
   applying a substantial pressure between said die plungers to conform said boule to and essentially fill said cavity; and
   allowing the formed boule to cool relatively slowly.

2. The method of claim 1 wherein said alkali halide is KCl and said temperature is about 300° C.
3. The method of claim 1 wherein said alkali halide is NaCl and said temperature is about 300° C.
4. The method of claim 1 wherein said alkali halide is KBr and said temperature is about 300° C.
5. The method of claim 1 wherein said alkali halide is CsBr and said temperature is about 225° C.
6. The method of claim 1 wherein said alkali halide is KI and said temperature is about 225° C.
7. The method of claim 1 wherein said alkali halide is CsI and said temperature is about 225° C.
8. The method of forming an infrared optical element of preselected shape and mass, said method comprising:
   providing at least two die components, said components having surfaces defining therebetween a cavity having a shape corresponding to the desired configuration of the optical element to be formed;
   placing between said surfaces a boule grown from a molten mass of a selected alkali halide and having a mass slightly greater than said preselected mass;
   heating said die components and said boule to a temperature at which surface fissures in said boule do not propagate;
   applying a substantial pressure between said die components to conform said boule at least generally to the shape of said cavity;
   allowing said die components and the formed boule to cool relatively slowly;
   washing said formed boule to remove surface blemishes and to reduce the mass of said formed boule to said preselected mass;
   placing said washed and formed boule between said surfaces;
   heating said die components and said boule to said temperature;
   applying a substantial pressure between said die components to conform said boule closely to the shape of said cavity; and
   allowing said die components and the thereby formed optical element to cool relatively slowly.

References Cited
UNITED STATES PATENTS

| | | | |
|---|---|---|---|
| 3,465,074 | 9/1969 | Neuroth et al. | 264—1 X |
| 3,236,595 | 2/1966 | Carnall, Jr., et al. | 264—1 UX |
| 3,431,326 | 3/1969 | Letter | 264—1 |
| 3,124,623 | 3/1964 | Slawson | 264—1 |

OTHER REFERENCES

Rice, Deformation, Recrystallization, Strength, and Fracture of Press-Forged Ceramic Crystals, 55 J. Am. Ceramic Soc'y 90–97 (April 1968).

Kreidl et al., Fabrication of Infrared Transmitting Materials by Hot Pressing Techniques, WADC TR 58–275 pt. II (June 1959).

Traskin et al., Preparation of Polycrystalline Alkali Halides by the Deformation of Single Crystals at High Temperatures, 1970, CA 73:113724q.

ROBERT F. WHITE, Primary Examiner
A. M. SOKAL, Assistant Examiner

U.S. Cl. X.R.

264—233, 294, 322, 325; 156—228, 245